(12) United States Patent
Royer

(10) Patent No.: US 12,172,223 B2
(45) Date of Patent: Dec. 24, 2024

(54) SOLID END MILL

(71) Applicant: AB SANDVIK COROMANT, Sandviken (SE)

(72) Inventor: Raphael Royer, Hagersten (SE)

(73) Assignee: AB Sandvik Coromant, Sadviken (SE)

( * ) Notice: Subject to any disclaimer, the term of this patent is extended or adjusted under 35 U.S.C. 154(b) by 545 days.

(21) Appl. No.: 17/609,466

(22) PCT Filed: Apr. 2, 2020

(86) PCT No.: PCT/EP2020/059440
§ 371 (c)(1),
(2) Date: Nov. 8, 2021

(87) PCT Pub. No.: WO2020/224881
PCT Pub. Date: Nov. 12, 2020

(65) Prior Publication Data
US 2022/0266356 A1    Aug. 25, 2022

(30) Foreign Application Priority Data
May 9, 2019 (EP) ..................................... 19173610

(51) Int. Cl.
*B23C 5/10* (2006.01)
(52) U.S. Cl.
CPC ...................... *B23C 5/10* (2013.01)
(58) Field of Classification Search
CPC ........... B23C 5/10; B23C 5/1009; B23C 5/12; B23C 5/14; B23C 2210/04;
(Continued)

(56) References Cited

U.S. PATENT DOCUMENTS 7,862,263 B2 * 1/2011 van Iperen ................ B23C 5/10
407/54
2012/0282044 A1 * 11/2012 Volokh ...................... B23C 5/10
407/53
(Continued)

FOREIGN PATENT DOCUMENTS

DE         10119645 A1 *  5/2002 ............. B23B 51/08
DE     102017102473 A1    8/2018

OTHER PUBLICATIONS

DE 102017102473 Machine Translation (Year: 2024).*
DE-10119645-A1 Machine Translation (Year: 2024).*

*Primary Examiner* — Nicole N Ramos
(74) *Attorney, Agent, or Firm* — Corinne R. Gorski

(57) ABSTRACT

A solid end mill is rotatable around a central rotational axis and includes a cutting portion having a plurality flutes with peripheral cutting edges formed between associated rake surfaces and clearance surfaces. The peripheral cutting edge forms a convexly curved lobe cutting edge portion disposed along an axial front part of the cutting portion. A neck cutting edge portion is connected to the lobe cutting edge portion and is disposed along an axial intermediate part of the cutting portion. A shoulder cutting edge portion is connected to the neck cutting edge portion and is disposed along an axial rear part of the cutting portion. The peripheral cutting edge extends at a linear and constant axial inclination angle $\theta$ within the range $5°\leq\theta\leq15°$. The rake surface forms positive radial rake angles $\alpha_{L,N,S}$ along the entire extension of the peripheral cutting edge.

13 Claims, 3 Drawing Sheets

(58) Field of Classification Search
CPC .......... B23C 2210/242; B23C 2210/40; B23C 2215/44; B23C 2215/48; B23C 2215/52; B23C 2215/56; B23C 2220/366
See application file for complete search history.

(56) References Cited

U.S. PATENT DOCUMENTS

| | | | |
|---|---|---|---|
| 2013/0251472 A1* | 9/2013 | Mori | B23C 3/30 407/54 |
| 2018/0079016 A1 | 3/2018 | Azegami | |

* cited by examiner

SOLID END MILL

RELATED APPLICATION DATA

This application is a § 371 National Stage Application of PCT International Application No. PCT/EP2020/059440 filed Apr. 2, 2020 claiming priority to EP 19173610.7 filed May 9, 2019.

TECHNICAL FIELD OF THE INVENTION

The present invention relates to a solid end mill being rotatable around a central rotational axis, wherein the solid end mill has a cutting portion and a shank portion. The cutting portion includes a plurality of flutes with peripheral cutting edges formed between associated rake surfaces and clearance surfaces. Each peripheral cutting edge, in a view perpendicular to the central rotational axis and toward the rake surface of the solid end mill, is forming a single convexly curved lobe cutting edge portion disposed along an axial front part of the cutting portion and a single neck cutting edge portion connected to the lobe cutting edge portion. The neck cutting edge portion extends at a smaller radial distance to the central rotational axis compared to the convexly curved lobe cutting edge portion and is disposed along an axial intermediate part of the cutting portion. The peripheral cutting edge is further forming a shoulder cutting edge portion connected to the neck cutting edge portion. The shoulder cutting edge portion extends at a larger radial distance to the central rotational axis compared to the neck cutting edge portion and is disposed along an axial rear part of the cutting portion.

BACKGROUND OF THE INVENTION AND PRIOR ART

There are known end mills that has peripheral cutting edges, which in a view perpendicular to the central rotational axis and toward the rake surface is forming a specific profile for milling a dovetail slot in a workpiece. More precisely, the specific profile is for example used in the milling of dovetail slots in a turbine engine disc component for mounting turbine blades in an aircraft engine, whereby the dovetail slot matches the profile on a root portion of the turbine blade mounted therein. The dovetail slot is also known as a single tang dovetail slot, which is typically used for mounting a relatively low-weight turbine blade. This type of end mill is sometimes referred to as a tulip or onion cutter.

A broaching operation can also be used, as an alternative to a milling operation, for machining the single tang dovetail slot for mounting the turbine blades. However, a broaching machine is quite large-sized and is also relatively inefficient at machining the dovetail slots compared to milling tools. Hence, the tulip (or onion) end mill has been developed to increase the productivity and facilitate the manufacturing of the single tang dovetail slot.

A known solid end mill of the tulip/onion type hereby comprises straight and non-inclined peripheral cutting edges (and flutes) as seen in a view perpendicular to the rotational axis and toward the clearance surface of the peripheral cutting edge. Furthermore, the known tulip/onion end mill comprises peripheral cutting edges with rake surfaces forming radial rake angles at about zero degrees as seen in cross-sections perpendicular to the rotational axis.

The single tang dovetail (tulip/onion) profile is associated with problems in either the manufacturing/grinding or the cutting performance and tool life of the solid end mill. More precisely, it's associated with problems in manufacturing/grinding a suitable radial rake angle on the peripheral cutting edges due to a large difference in diameter between the single convexly curved lobe cutting edge portion and the single neck cutting edge portion. The grinding operation can be facilitated by providing straight and non-inclined axial flutes on the end mill, whereby the grinding of a desired radial rake angle is more easily achieved along the peripheral cutting edges. However, the straight and non-inclined flutes with associated peripheral cutting edges may provide rather poor cutting performance, tool life and chip evacuation. It's also in general known to provide solid end mills with a flute helix, but this complicates the manufacturing/grinding operation on the solid end mill and may additionally cause rather large variations on the radial rake angles between the large diameter lobe cutting edge portion and the small diameter neck cutting edge portion.

SUMMARY OF THE INVENTION

The object of the invention is that of simplifying the manufacturing, improving the cutting performance and tool life of the solid end mill. This is achieved by the solid end mill of claim 1. The solid end mill is characterized in that each peripheral cutting edge, in a view perpendicular to the central rotational axis and toward the clearance surface, extends at a linear and constant axial inclination angle $\theta$ within the range $5° \leq \theta \leq 15°$ in relation to the central rotational axis, wherein the rake surface, as seen in cross-sections perpendicular to the central rotational axis, is forming positive radial rake angles $\alpha_{L,\,N,\,S}$ along the entire extension of the peripheral cutting edge.

The linear and constant axial inclination angle within this range facilitates a manufacturing/grinding operation of the rake surface, particularly a grinding operation that provides positive radial rake angles along the entire extension of the peripheral cutting edge (the convexly curved lobe cutting edge portion, neck cutting edge portion and shoulder cutting edge portion). A grinding wheel can in this way be aligned with the linear and constant axial inclination angle within the range $5° \leq \theta \leq 15°$, and further tilted to grind the positive radial rake angles along the entire extension of the peripheral cutting edge in one single pass. The grinding wheel hereby does not have follow a more complicated helical path including a swing angle as the grinding wheel follows any helix around the circumference of the end mill, which may also cause significant variations on the radial rake angles between the lobe, neck and shoulder cutting edge portions. An axial inclination angle below 5° approaches the known tulip end mill having the non-inclined flutes, whereby for instance the cutting performance and chip evacuation becomes inadequate. However, an axial inclination angle above 15°, given the axial extension on the peripheral cutting edges of the tulip/onion end mill, may lead to peripheral cutting edges that extend in a helix around the circumference of the solid end mill, whereby the grinding operation becomes more complex including the undesired variations on the radial rake angles. Hence, the linear and constant axial inclination angle within the claimed range facilitates the grinding and provides an improved control of the (positive) radial rake angles along the entire peripheral cutting edge. In other words, the radial rake angles will exhibit more moderate variations between the lobe, neck and shoulder cutting edge portions, while particularly ensuring that the neck cutting edge portion exhibits a positive radial rake angle.

The positive radial rake angle along the neck cutting edge portion reduces the strains on the relatively weaker neck, whereby the tool life is improved. The cutting forces are also reduced by the positive radial rake angles along the entire peripheral cutting edge, which not only improves the cutting performance but also reduces the tendency for vibrations to arise during milling. This further contributes to the improved tool life. The cutting performance and tool life is not only enhanced by the positive radial rake angle, but also by the linear and constant axial inclination angle on the peripheral cutting edges and the associated flutes, which also improves chip evacuation compared to solid end mills having straight and non-inclined peripheral cutting edges/flutes. The linear and constant axial inclination angle also enables an increased number of flutes and peripheral cutting edges on the cutting portion compared to straight and non-inclined flutes, which in turn provides for a more stable cutting action (reduced vibrations) and improved cutting performance/tool life.

According to an embodiment of the solid end mill, the positive radial rake angles $\alpha_{L, N, S}$ are within the range $2° \leq \alpha_{L, N, S} \leq 15°$ along the entire extension of the peripheral cutting edge. The positive rake angle will vary between the lobe, neck and shoulder cutting edge portions due to the differences in the radial distances to the central rotational axis and the axial inclination angle. The neck cutting edge portion will hereby typically exhibit the smallest positive radial rake angle in relation to the lobe and shoulder cutting edge portions. Yet the smallest positive radial rake angle on the neck cutting edge portion in accordance with this embodiment is at least 2° to ensure a positive cutting action/reduction of strains on the neck cutting edge portion to beneficially increase the tool life. Preferably the lower end of the range is further increased so that the positive radial rake angles $\alpha_{L, N, S}$ are within the range $4° \leq \alpha_{L, N, S} \leq 15°$ along the entire extension of the peripheral cutting edge.

According to an embodiment of the solid end mill, the positive radial rake angles $\alpha_{L, S}$ on the rake surface along the convexly curved lobe cutting edge portion and shoulder cutting edge portion are larger than the positive radial rake angle $\alpha_N$ on the rake surface along the neck cutting edge portion. This enhances the cutting performance of the lobe and shoulder cutting edge portions disposed at the largest radial distances to the central rotational axis, which further reduces the cutting forces and vibrations during milling. This not only improves machining precision but also further enhances the tool life.

According to a further embodiment of the solid end mill, the rake surface along the convexly curved lobe cutting edge portion, neck cutting edge portion and shoulder cutting edge portion is situated in a common plane. This facilitates the grinding of the rake surfaces, since it enables a flat surface grinding operation of the entire rake surface in one pass by means of inserting a grinding wheel at the axial inclination angle and at a suitable tilt angle corresponding to the desired positive radial rake angles of the lobe, neck and shoulder cutting edge portions. The manufacturing of the solid end mill is hereby further facilitated.

According to yet one embodiment of the solid end mill, each peripheral cutting edge, in a view perpendicular to the central rotational axis and toward the clearance surface, extends at an axial inclination angle θ within the range $8° \leq \theta \leq 12°$ in relation to the central rotational axis. The linear and constant axial inclination angle within this sub-range further facilitates the manufacturing/grinding operation of the positive radial rake angles, while the axial inclination angle also ensures sufficient cutting performance/chip evacuation. An optimised control of the variation on the positive radial rake angles as well as an enhanced cutting performance and tool life is thereby achieved by the linear and constant axial inclination angle within the range of this embodiment.

In a further embodiment of the solid end mill, each flute comprises a bottom surface, which is situated closest to the central rotational axis and extends at the axial inclination angle, wherein a radial distance between the bottom surface and the central rotational axis continuously increases in a direction from the axial front part of the cutting portion toward the axial rear part of the cutting portion. The bottom surface, as seen in a view toward the rake surface, may hereby axially extend in a curved manner, preferably at a specific radius of curvature, from the axial front part of the cutting portion toward the axial rear part of the cutting portion. In this way the bottom surface of the flute is beneficially adapted to accommodate a grinding wheel with a corresponding radius as the bottom surface, wherein the grinding wheel can be inserted into the flute and the flat grinding surface of the grinding wheel is used for grinding the rake surface.

In yet one embodiment of the solid end mill, the smaller radial distance between the neck cutting edge portion and the central rotational axis is 50%-70% of a largest radial distance between the convexly curved lobe cutting edge portion and the central rotational axis. Preferably said smaller radial distance is 50%-60% of said largest radial distance. Accordingly, the neck cutting edge portion extends at a significantly smaller radial distance compared to the lobe cutting edge portion. In other words, the neck cutting edge portion is relatively slender on the solid end mill, wherein the invention is beneficially used as such relatively slender neck cutting edge portion is evidently not as strong/robust as larger-sized neck cutting edge portions. The smaller radial distance between the neck cutting edge portion and the central rotational axis may also be 50%-70% of the larger radial distance between the shoulder cutting edge portion and the central rotational axis. The shoulder cutting edge portion may extend at a (slightly) smaller radial distance compared to the largest radial distance on the lobe cutting edge portion, wherein the neck cutting edge portion forms the slender intermediate part of the cutting portion. In other words, the single tang dovetail (tulip/onion) type end mill has a relatively slender neck cutting edge portion with the lobe cutting edge portion exhibiting a slightly larger diameter compared to the shoulder cutting edge portion. The invention is hereby particularly beneficial for facilitating the manufacturing, improving the cutting performance and enhancing the tool life. Furthermore, the smaller radial distance between the neck cutting edge portion and the central rotational axis may be within a range of 1.5 mm $\leq D_N \leq$ 8 mm. Thus, the solid end mill of this embodiment is configured for milling small-sized dovetail slots and has a very slender neck cutting edge portion.

In a further embodiment of the solid end mill, the cutting portion has at least five flutes having identical peripheral cutting edges and associated rake surfaces. This further increases the stability (reduced vibrations) in milling, which provides an improved tool life. Additionally, as previously mentioned, the linear and constant axial inclination angle of the present invention also enables an increased number of flutes and peripheral cutting edges on the cutting portion compared to straight and non-inclined flutes, which typically exhibit three or at most four flutes with identical peripheral cutting edges.

In a further embodiment of the solid end mill, one pair of adjacent peripheral cutting edges is spaced at a greater or smaller distance (or angle) in a circumferential direction compared to another pair of adjacent peripheral cutting edges, so that a differential pitch is provided between the peripheral cutting edges. Hence, some pairs of adjacent peripheral cutting edges or all pairs of peripheral cutting edges can be provided at the unequal/differential pitch compared to each other. This further increases the stability or reduces vibrations during milling, which in turn increases the tool life.

In an embodiment of the solid end mill, each peripheral cutting edge further comprises a concavely curved chamfer cutting edge portion connected to the shoulder cutting edge portion, wherein the concavely curved chamfer cutting edge portion is extending radially outwards at the end of the shoulder cutting edge portion. In this way a radiused chamfer can be milled in the top end of the dovetail slot, which is adapted for inserting a root portion of a turbine blade.

According to yet one embodiment the solid end mill is provided with an internal axial coolant channel having an outlet opening in a front end of the solid end mill. In this way liquid coolant supplied to the solid end mill can enter at the bottom of the dovetail slot and aid the chip evacuation by flushing the chips out of the dovetail slot via the flutes. The end mill is also used for milling components made of heat resistant super alloys, such as Inconel®, whereby the liquid coolant beneficially cools the peripheral cutting edges of the solid end mill as it flushes out the chips via the flutes.

BRIEF DESCRIPTION OF THE DRAWINGS

An embodiment is hereby described with references to the drawings, in which.

DETAILED DESCRIPTION OF AN EMBODIMENT OF THE INVENTION

Figure 1:
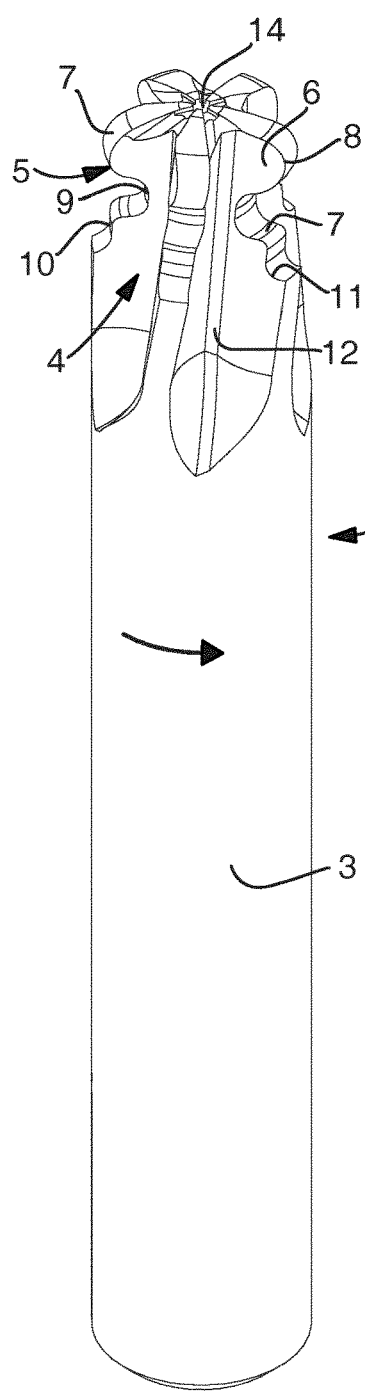
FIG. 1. shows a perspective view of a solid end mill according to an embodiment of the invention.

FIGS. 1-8 discloses a solid end mill according to an embodiment of the present invention. The solid end mill 1 is rotatable around a central rotational axis R, wherein the solid end mill has a cutting portion 2 and a shank portion 3. The cutting portion 2 includes a plurality flutes 4 with peripheral cutting edges 5 formed between associated rake surfaces 6 and clearance surfaces 7. Each peripheral cutting edge 5, in a view perpendicular to the central rotational axis and toward the rake surface 6, is forming a single convexly curved lobe cutting edge portion 8 disposed along an axial front part of the cutting portion 2. A single neck cutting edge portion 9 is connected to the convexly curved lobe cutting edge portion 8, wherein the neck cutting edge portion 9 extends at a smaller radial distance $D_N$ to the central rotational axis R compared to the convexly curved lobe cutting edge portion 8 and is disposed along an axial intermediate part of the cutting portion 2. A shoulder cutting edge portion 10 is connected to the neck cutting edge portion 9, wherein the shoulder cutting edge portion 10 extends at a larger radial distance $D_S$ to the central rotational axis R compared to the neck cutting edge portion 9 and is disposed along an axial rear part of the cutting portion 2. The shoulder cutting edge portion 10 is extending essentially in parallel with the central rotational axis R to machine a shoulder surface at the top end portion of the dovetail slot for mounting the root portion of the turbine blade.

Each peripheral cutting edge 5 further comprises a concavely curved chamfer cutting edge portion 11 connected to the shoulder cutting edge portion 10, wherein the concavely curved chamfer cutting edge portion 11 is extending radially outwards at the end of the shoulder cutting edge portion 10. This produces a rounded chamfer at the top end of the dovetail slot. Hence, the concavely curved chamfer cutting portion 11 produces a rounded corner and defines the depth of the single tang dovetail slot being milled or, in other words, a maximum depth of cut used when milling with the solid end mill.

Figure 2:
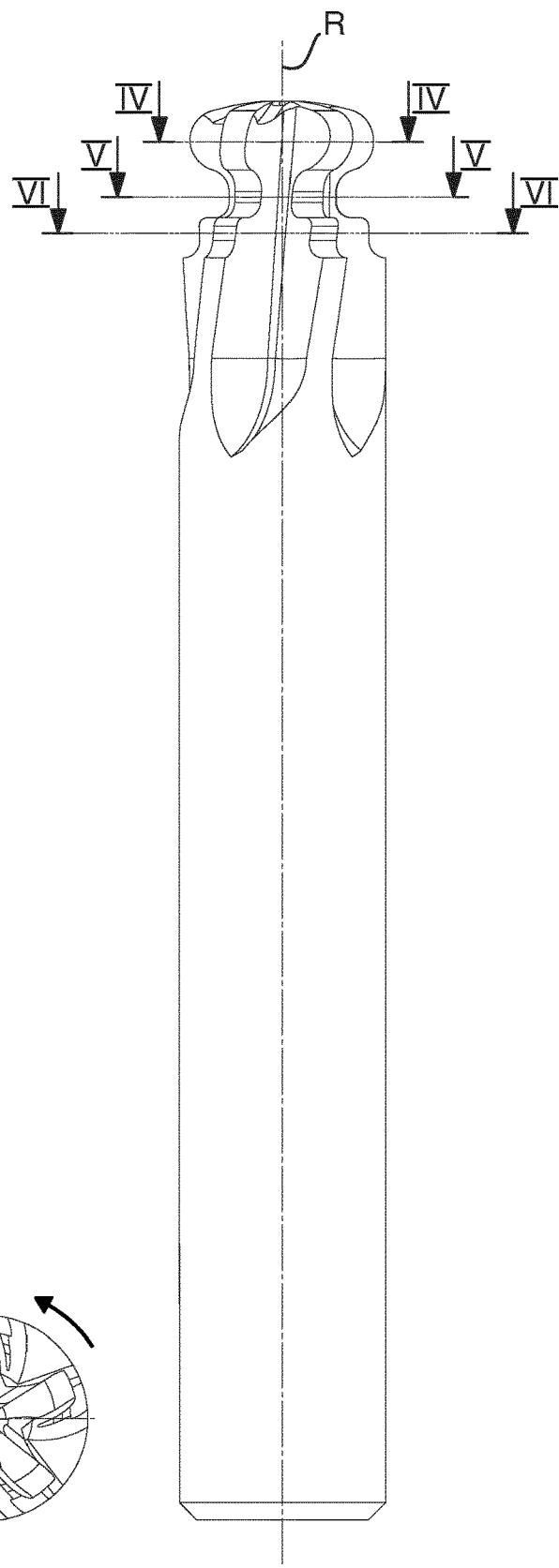
FIG. 2 shows a side view of the solid end mill of the embodiment including three different cross-sectional lines IV-IV, V-V and VI-VI perpendicular to a central rotational axis of the solid end mill.
Figure 4:
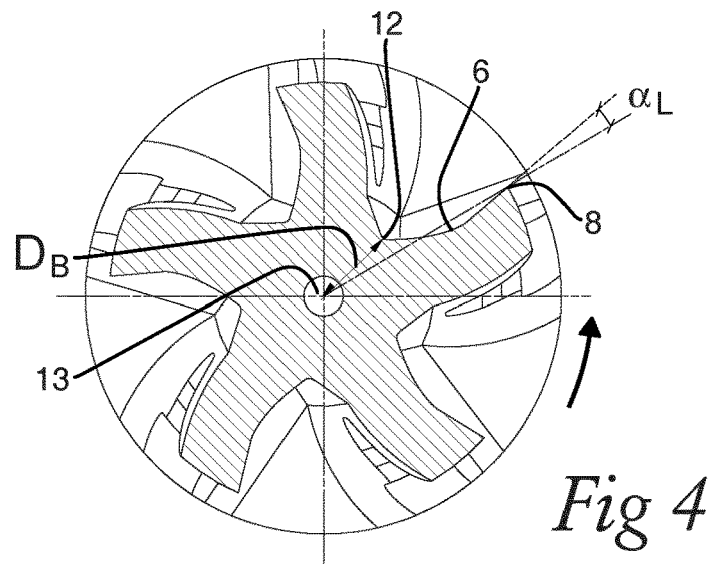
FIGS. 4-6 show cross-sections IV-IV, V-V and VI-VI respectively in FIG. 2.
Figure 5:
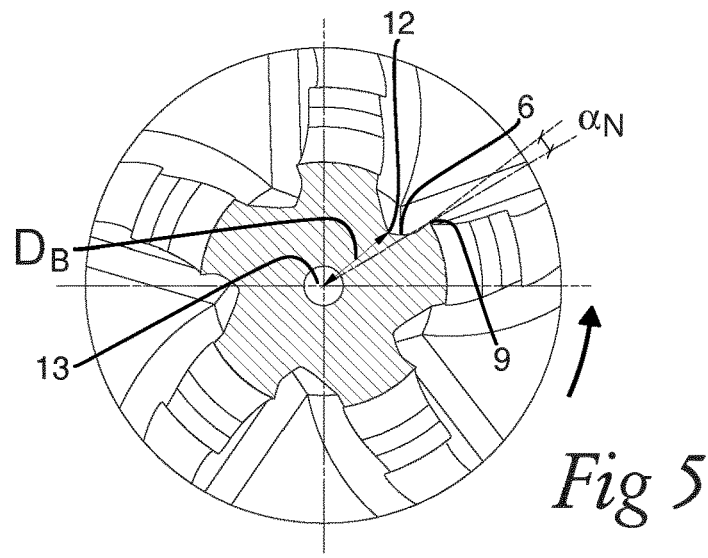
Figure 6:
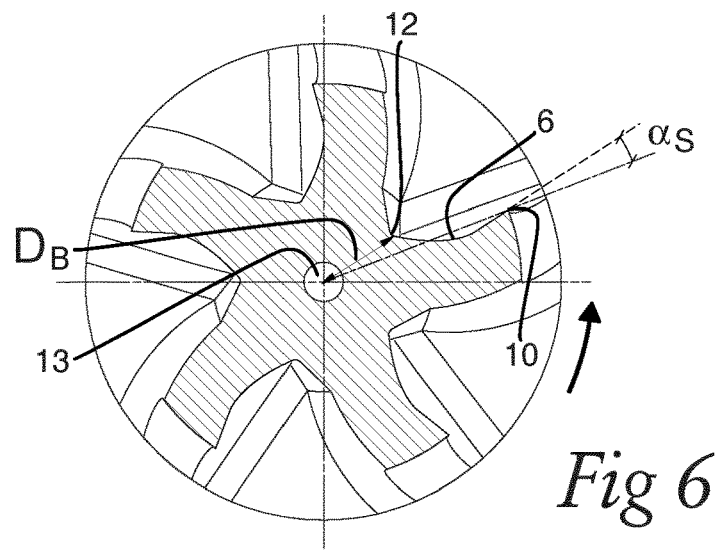
Figures 7, 8:
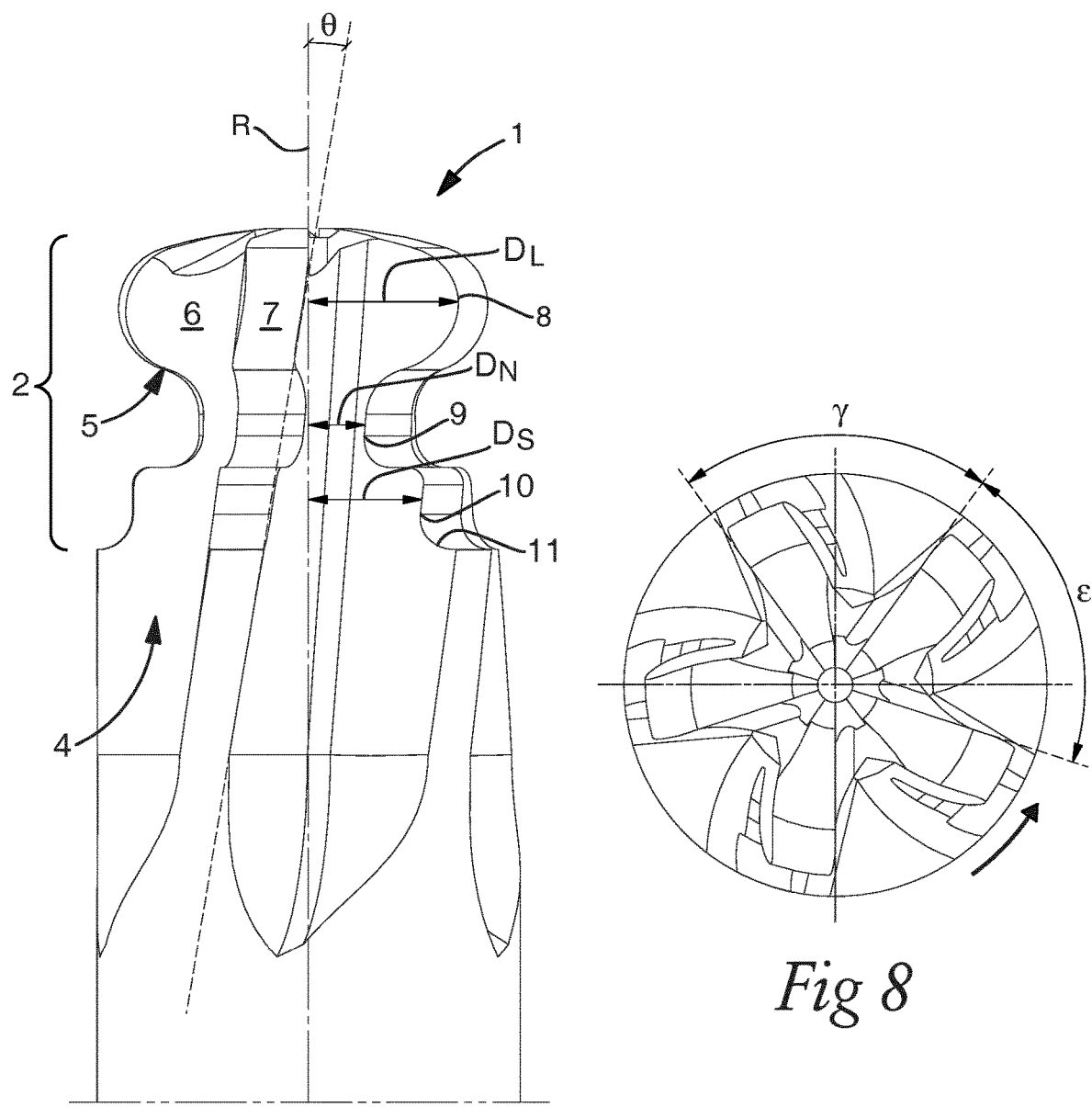
FIG. 7 shows an enlarged side view perpendicular to the central rotational axis and toward a clearance surface of one of the peripheral cutting edges.
FIG. 8 shows an enlarged axial front view of the solid end mill.

The peripheral cutting edge 5, as seen in FIG. 7, in a view perpendicular to the central rotational axis R and toward the clearance surface 7, extends at a linear and constant axial inclination angle θ within the range 5°≤θ≤15°, and preferably within the range 8°≤θ≤12°, in relation to the central rotational axis R. In the shown embodiment the axial inclination angle θ is 10° in relation to the central rotational axis R. Furthermore, as seen in FIGS. 4-6, the rake surface 6, as seen in cross-sections IV-IV, V-V and VI-VI perpendicular to the central rotational axis R as also shown in FIG. 2, is forming positive radial rake angles $\alpha_{L, N, S}$ along the entire extension of the peripheral cutting edge 5. The positive radial rake angles $\alpha_{L, N, S}$ are within the range 2°≤$\alpha_{L, N, S}$≤15°, and preferably within the range 4°≤$\alpha_{L, N, S}$≤15°, along the entire extension of the peripheral cutting edge 5. Moreover, the positive radial rake angles $\alpha_{L, S}$ on the rake surface 6 along the convexly curved lobe cutting edge portion 8 and the shoulder cutting edge portion 10 are larger than the positive radial rake angle $\alpha_N$ on the rake surface along the neck cutting edge portion 9. In the embodiment shown the radial rake angle $\alpha_L$ on the convexly curved lobe cutting edge portion 8 is approximately 10° and the radial rake angle $\alpha_N$ on the neck cutting edge portion 9 is approximately 7°. Additionally, the radial rake angle $\alpha_S$ on the shoulder cutting edge portion 10 in the shown embodiment is approximately 12°.

The rake surface 6 along the convexly curved lobe cutting edge portion 8, neck cutting edge portion 9 and shoulder cutting edge portion 10 is situated in a common plane. Hence, the radial rake angle is achieved by grinding the rake surface in a single flat grinding operation. The difference in radial rake angles $\alpha_{L, N, S}$ is due to the axial inclination angle θ and the different radial distances $D_{L, N, S}$ on the lobe, neck and shoulder cutting edge portions in relation to the central rotational axis R.

Each flute 4 comprises a bottom surface 12, which is situated closest to the central rotational axis R and extends at the axial inclination angle θ, wherein a radial distance DB between the bottom surface 12 and the central rotational axis R continuously increases in a direction from the axial front part of the cutting portion 2 toward the axial rear part of the cutting portion 2. More precisely, the bottom surface 12, as seen in a view toward the rake surface 6, is axially extending in a slightly curved manner, at a radius of curvature, from the axial front part of the cutting portion 2 toward the axial rear part of the cutting portion 2. This facilitates the grinding operation with a grinding wheel having a corresponding radius as the bottom surface, as the grinding wheel is inserted into the flute and a flat grinding surface of the grinding wheel is used for grinding the rake surface.

The smaller radial distance $D_N$ between the neck cutting edge portion 9 and the central rotational axis R may be 50%-70% of a largest radial distance $D_L$ between the convexly curved lobe cutting edge portion 8 and the central rotational axis R. More precisely, the shown embodiment exhibits a radial distance $D_N$ between the neck cutting edge portion 9 and the central rotational axis R, which is approximately 58% of the largest radial distance $D_L$ between the convexly curved lobe cutting edge portion 8 and the central rotational axis R. Moreover, the smaller radial distance $D_N$ between the neck cutting edge portion 9 and the central rotational axis R may also be 50%-70% of the larger radial distance $D_S$ between the shoulder cutting edge portion 10 and the central rotational axis R. More precisely, the shown embodiment exhibits a smaller radial distance $D_N$ between the neck cutting edge portion 9 and the central rotational axis R, which is 62% of the larger radial distance $D_L$ between the shoulder cutting edge portion 10 and the central rotational axis R. The smaller radial distance $D_N$ between the neck cutting edge portion 8 and the central rotational axis R may be within the range 1.5 mm≤$D_N$≤8 mm. In other words, the single neck cutting edge portion is relatively slender. In this embodiment, the smaller radial distance $D_N$ on the neck cutting edge portion is approximately 3.11 mm and the largest radial distance $D_L$ between the convexly curved lobe cutting edge portion 8 and the central rotational axis R is 5.4 mm. Additionally, the radial distance $D_S$ between the shoulder cutting edge portion 10 and the central rotational axis R is 5 mm in the shown embodiment.

Figure 3:
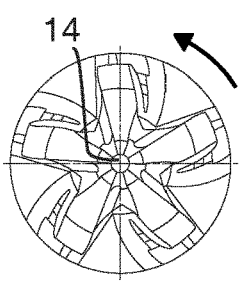
FIG. 3 shows an axial front view of the solid end mill of the embodiment.

As can be seen in FIGS. 3 and 8, the cutting portion 2 is provided with five flutes 4 having identical peripheral cutting edges 5 and associated rake surfaces 6. Furthermore, one pair of adjacent peripheral cutting edges 5 is spaced at a greater or smaller distance ε, γ in a circumferential direction compared to another pair of adjacent peripheral cutting edges 5, so that a differential pitch is provided between the peripheral cutting edges 5.

Furthermore, the solid end mill includes an internal axial coolant channel 13 extending along the central rotational axis R, wherein the internal axial coolant channel 13 has an outlet opening 14 in a front end of the solid end mill. Hence, liquid coolant is supplied via an inlet opening in a rear end of the shank portion 3 and conducted through the internal axial coolant channel 13 to the outlet opening 14 in the front end of the solid end mill. The coolant thereby enters at the bottom of the dovetail slot during a milling operation and flushes the chips out of the slot via the flutes of the solid end mill. Moreover, the solid end mill is used for milling slots in components made of super alloys, which are extremely heat resistant, so that most of the heat produced during milling is absorbed by the peripheral cutting edges 5. Accordingly, in this embodiment the liquid coolant supplied via the internal axial coolant channel 13 and discharged through the outlet opening 14 cools the peripheral cutting edges 5.

The invention is of course not limited to the embodiment disclosed but may be varied and modified within the scope of the appended claims. The solid end mill may for instance include four flutes, instead of five, having identical peripheral cutting edges and associated rake surfaces. Furthermore, it's not necessary that the cutting portion is provided with a concavely curved chamfer cutting edge portion. The rounded or chamfered edges at the top end of the dovetail slot may instead be produced in a different machining operation. The solid end mill may also be formed without the internal axial coolant channel and the outlet opening at the front end. The internal axial coolant channel, depending on the size of the solid end mill and the internal axial coolant channel, can hereby weaken the core of the solid end mill to such a degree that the tool life decreases instead of increases. Additionally, the peripheral cutting edges may be subjected to so called micro-geometrical edge treatment, wherein the peripheral cutting edge in a cross-section is provided with an edge rounding (ER) or reinforcement land/bevel to increase the strength of the peripheral cutting edges.

The invention claimed is:

1. A solid end mill being rotatable around a central rotational axis, the solid end mill comprising:
   a cutting portion; and
   a shank portion, the cutting portion including a plurality flutes having peripheral cutting edges formed between associated rake surfaces and clearance surfaces, wherein each peripheral cutting edge, in a view perpendicular to the central rotational axis and toward the rake surface, forms:
      a single convexly curved lobe cutting edge portion disposed along an axial front part of the cutting portion,
      a single neck cutting edge portion connected to the convexly curved lobe cutting edge portion, wherein the neck cutting edge portion extends at a smaller radial distance to the central rotational axis compared to the convexly curved lobe cutting edge portion and is disposed along an axial intermediate part of the cutting portion, and
      a shoulder cutting edge portion connected to the neck cutting edge portion, wherein the shoulder cutting edge portion extends at a larger radial distance to the central rotational axis compared to the neck cutting edge portion and is disposed along an axial rear part of the cutting portion, and
   wherein each peripheral cutting edge, in the view perpendicular to the central rotational axis and toward the clearance surface, extends at a linear and constant axial inclination angle θ within the range 5°≤θ≤15° in relation to the central rotational axis, wherein the rake surface, as seen in cross-sections perpendicular to the central rotational axis, form a positive radial rake angles $α_{L,N,S}$ along an entire extension of the peripheral cutting edge, and wherein the positive radial rake angles $α_{L,N,S}$ on the rake surface along the convexly curved lobe cutting edge portion and the shoulder cutting edge portion are larger than the positive radial rake angle $α_N$ on the rake surface along the neck cutting edge portion.

2. The solid end mill of claim 1, wherein the positive radial rake angles $α_{L,N,S}$ are within the range 2°≤$α_{L,N,S}$≤15° along the entire extension of the peripheral cutting edge.

3. The solid end mill according to claim 1, wherein the rake surface along the convexly curved lobe cutting edge portion, neck cutting edge portion and shoulder cutting edge portion is situated in a common plane.

4. The solid end mill according to claim 1, wherein each peripheral cutting edge, in the view perpendicular to the central rotational axis and toward the clearance surface, extends at an axial inclination angle θ within the range 8°≤θ≤12° in relation to the central rotational axis.

5. The solid end mill according to claim 1, wherein each flute includes a bottom surface, which is situated closest to the central rotational axis and extends at the axial inclination angle θ, wherein a radial distance between the bottom surface and the central rotational axis continuously increases in a direction from an axial front part of the cutting portion toward an axial rear part of the cutting portion.

6. The solid end mill according to claim 5, wherein the bottom surface, as seen in a view toward the rake surface, is axially extending in a curved manner, at a specific radius of curvature, from the axial front part of the cutting portion toward the axial rear part of the cutting portion.

7. The solid end mill according to claim 1, wherein the smaller radial distance between the neck cutting edge portion and the central rotational axis is 50%-70% of a largest radial distance between the convexly curved lobe cutting edge portion and the central rotational axis.

8. The solid end mill according to claim 7, wherein the smaller radial distance between the neck cutting edge portion and the central rotational axis is 50%-70% of the larger radial distance between the shoulder cutting edge portion and the central rotational axis.

9. The solid end mill according to claim 7, wherein the smaller radial distance between the neck cutting edge portion and the central rotational axis is within the range 1.5 mm≤$D_N$≤8 mm.

10. The solid end mill according to claim 1, wherein the cutting portion has at least five flutes having identical peripheral cutting edges and associated rake surfaces.

11. The solid end mill according to claim 1, wherein one pair of adjacent peripheral cutting edges is spaced at a greater or smaller distance in a circumferential direction compared to another pair of adjacent peripheral cutting edges, so that a differential pitch is provided between the peripheral cutting edges.

12. The solid end mill according to claim 1, wherein each peripheral cutting edge further includes a concavely curved chamfer cutting edge portion connected to the shoulder cutting edge portion, the concavely curved chamfer cutting edge portion extending radially outwards at the end of the shoulder cutting edge portion.

13. The solid end mill according to claim 1, wherein an internal axial coolant channel is provided in the solid end mill, the internal axial coolant channel having an outlet opening in a front end of the solid end mill.

* * * * *